United States Patent
Chevalier et al.

[11] Patent Number: 4,784,087
[45] Date of Patent: Nov. 15, 1988

[54] CLAMPING APPARATUS FOR USE IN FOAMING WATER HEATERS

[75] Inventors: James L. Chevalier, Mequon; Douglas D. King, Menomonee Falls; John D. Pfeffer, Brookfield, all of Wis.; Allen L. Johnson, El Paso, Tex.

[73] Assignee: A. O. Smith Corporation, Milwaukee, Wis.

[21] Appl. No.: 107,642

[22] Filed: Oct. 13, 1987

[51] Int. Cl.⁴ .............................................. F22B 5/00
[52] U.S. Cl. .................................. 122/13 R; 29/157.4; 165/79; 122/234
[58] Field of Search .................. 122/13 R, 13 A, 234, 122/19, 493; 165/79, 76; 126/361; 29/157.4, 400 C

[56] References Cited

U.S. PATENT DOCUMENTS 2,698,007 12/1954 Tegler ............................... 122/13 R
4,561,494 12/1985 Frost ...................................... 165/76

Primary Examiner—Edward G. Favors
Attorney, Agent, or Firm—Andrus, Sceales, Starke & Sawall

[57] ABSTRACT

A clamping apparatus for use in applying foam resin insulation between the tank and the outer jacket of a water heater. The jacket of the water heater is spaced outwardly of the tank to provide a space that receives a foamable resin, such as polyurethane. The upper end of the jacket is enclosed by a thin, sheet metal cover. To clamp the cover to the jacket and prevent deformation of the cover due to the pressure of the resin foam, a clamping mechanism is utilized which includes a plate or clamping member that is positioned flatwise against the cover, and a clamp assembly secures the clamping plate to the upper end of a flue, or other tubular opening in the tank. In a preferred form, the clamping mechanism consists of a resilient, expandable plug which is inserted within the opening in the tank and is expanded outwardly into tight engagement with the wall bordering the opening to secure the clamping plate to the tank.

15 Claims, 2 Drawing Sheets

CLAMPING APPARATUS FOR USE IN FOAMING WATER HEATERS

BACKGROUND OF THE INVENTION

The conventional water heater consists of a tank to contain water to be heated and a jacket is spaced outwardly of the tank and the upper end of the jacket is enclosed by a sheet metal cover or lid. In the past, fiber glass insulation was applied in the space between the tank and jacket and more recently, foamable or expandable resins, such as polyurethane resin, have been employed as the insulation.

In the normal foaming operation, the liquid resin is introduced into the space between the tank and the jacket through an opening in the cover. As the resin expands, a substantial pressure is exerted upwardly against the cover. To resist this pressure of the expanding resin, the peripheral flange of the cover has been fastened to the upper edge of the jacket by screws, but even with this attachment the pressure of the expanding resin may tend to deform the cover, providing an unattractive appearance for the water heater.

SUMMARY OF THE INVENTION

The invention is directed to an apparatus for clamping the jacket cover to the water heater tank during the foaming operation to prevent deformation of the cover. The apparatus includes a clamping member or plate, which is positioned flatwise against the outer surface of the cover. The central portion of the clamping plate carries a resilient plug, which is inserted within a tubular member that projects upwardly from the upper head of the water heater tank. With a gas fired water heater, the tubular member constitutes the flue, while in an electric water heater the tubular member would constitute the spud attached to the upper head that receives the relief valve.

A clamping mechanism is employed to expand the plug outwardly into tight engagement with the inner wall of the tubular member to thereby clamp the plate against the cover. With the clamping plate firmly clamped against the cover, deformation of the cover is prevented as the resin expands within the space between the tank and the jacket.

In a preferred form of the invention, the clamping mechanism takes the form of a manually operated toggle unit which acts to compress the resilient plug axially, resulting in a radial expansion of the plug to secure to the plug to the flue, or other tubular member.

With the apparatus of the invention, the jacket cover is securely positioned with respect to the tank, so that deformation of the cover will be prevented during the foaming operation.

As the cured foam bonds to both the jacket and the cover, it is not necessary to connect the peripheral edge of the cover to the upper end of the jacket with screws or other fasteners, thereby resulting in a material and labor saving.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 2:
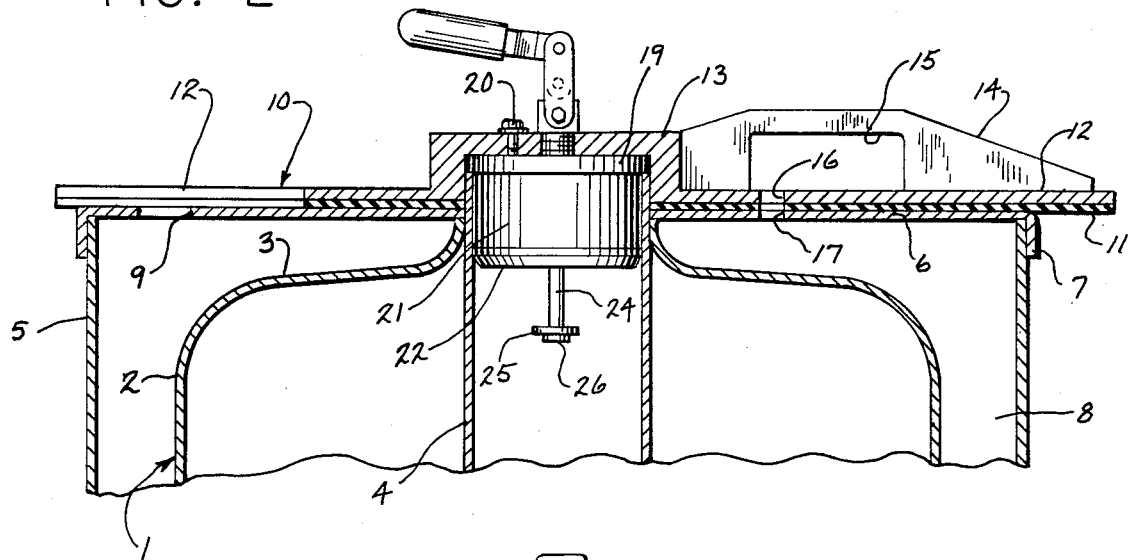
FIG. 2 is a section taken along line 2—2 of FIG. 1.
Figure 1:
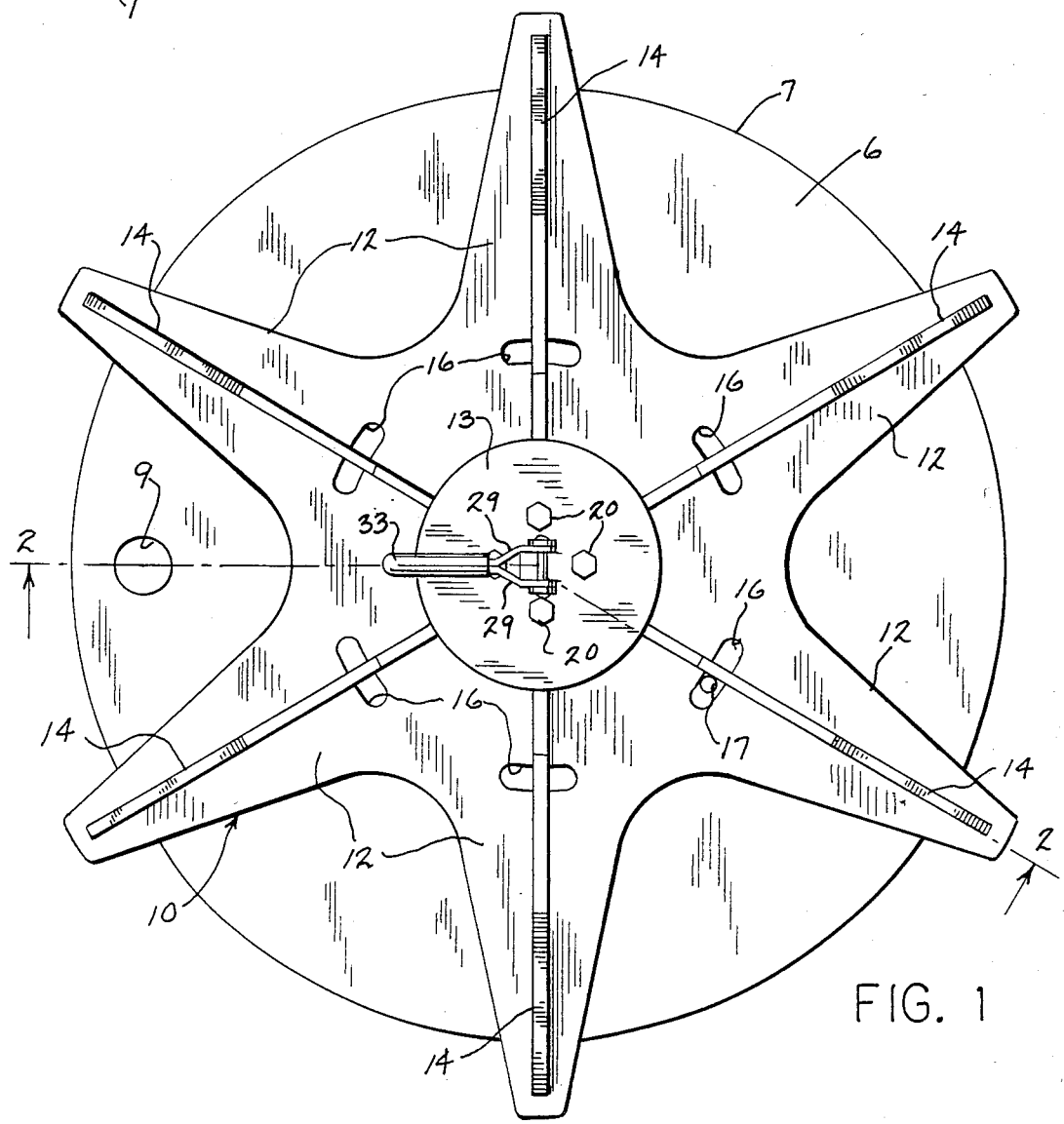
FIG. 1 is a top plan view of a water heater utilizing the clamping mechanism of the invention.

FIGS. 1 and 2 show a portion of a conventional water heater, which includes a tank 1 to contain water, or other liquid to be heated. Tank 1 is composed of a generally cylindrical shell 2, the upper end of which is enclosed by a head 3.

The water heater, as illustrated in the drawings is gas fired, and the waste gases of combustion are discharged upwardly through tank 1 through a central flue 4, the upper end of which projects beyond head 3, as shown in FIG. 2.

The surfaces of tank 1 exposed to the water can be coated with a corrosion resistant coating, such as glass or porcelain enamel, not shown.

Spaced outwardly of shell 2 of tank 1 is a generally cylindrical outer jacket 5 and the upper end of the jacket is enclosed by a thin, sheet metal cover 6 having a downwardly extending peripheral flange 7 which overlaps the upper edge of jacket 5.

The space 8 between tank 1 and jacket 5 is adapted to be filled with a foamable or expandable resin, such as polyurethane resin, and the liquid resin is introduced into space 8 through a fill opening 9 in cover 6.

The clamping mechanism of the invention includes a retaining member or plate 10 having a layer 11 of resilient material, such as rubber, on its lower surface which engages the upper surface of cover 6. Plate 10 is provided with a series of radially extending legs 12, the outer extremities of which project beyond the periphery of cover 6, as illustrated in FIG. 1.

The inner end of legs 12 are joined together at a central section 13, which projects upwardly, and a series of ribs 14 extend outwardly from central section 13 and are secured to the upper surfaces of legs, as shown in FIG. 1.

Each rib 14 is formed with an opening 15 and the inner end of each leg is provided with an arcuate slot 16, which extends to either side of the respective rib 14.

Cover 6 is provided with a worm hole 17 through which the resin foam expands during the foaming operation and hole 17 is aligned with one of the slots 16, as shown in FIG. 1. Clamping plate 10 is positioned on cover 6 in a manner so that the fill opening 9 is located in the space between adjacent legs 12 and regardless of the orientation of the clamping plate, the worm hole will be aligned with one of the slots 16.

The undersurface of central section 13 is provided with a cylindrical recess 18 and a metal disc 19 is secured within recess 18 by a group of screws 20.

Figure 3:
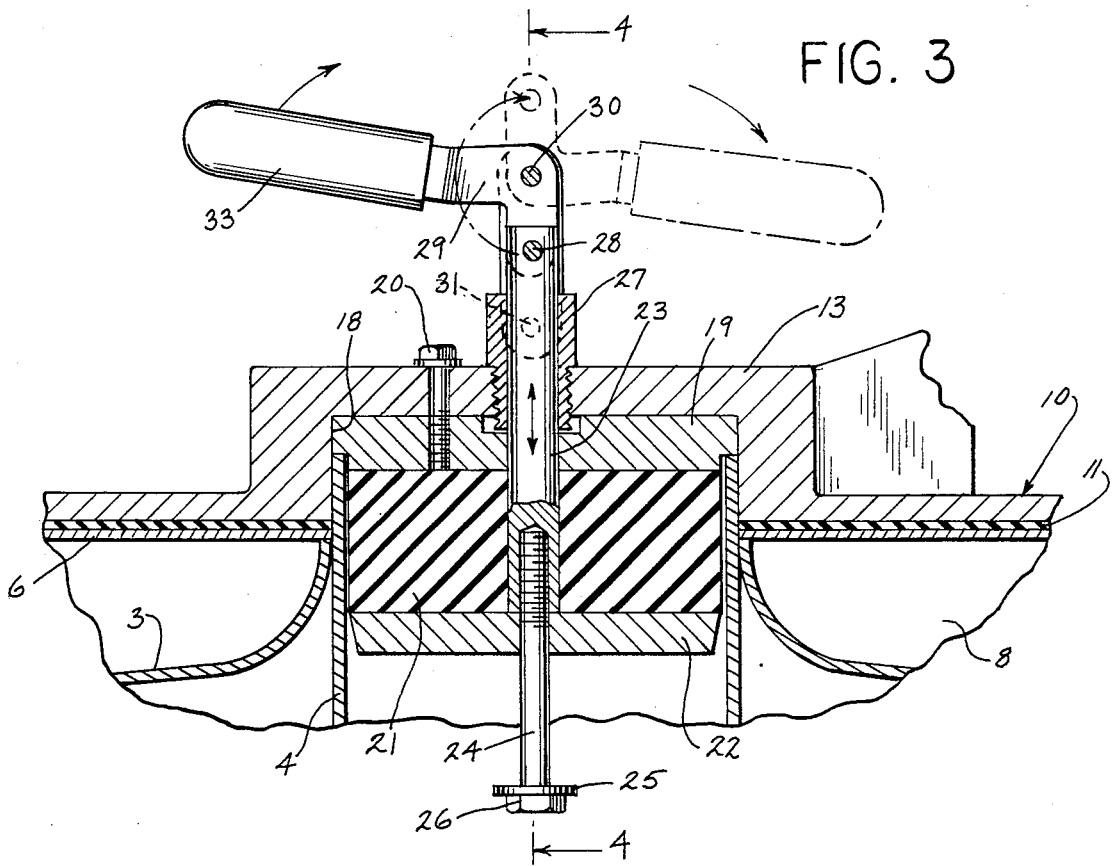
FIG. 3 is an enlarged fragmentary vertical section showing the resilient plug and the toggle mechanism.
Figure 4:
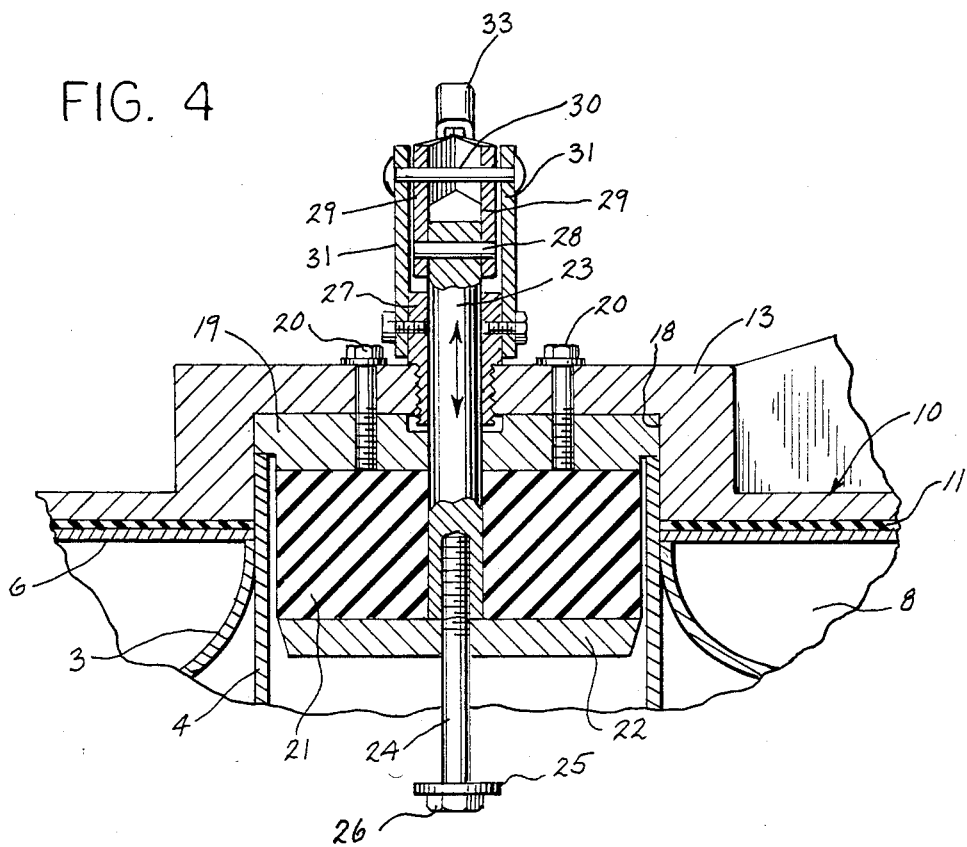
FIG. 4 is a section taken along line 4—4 of FIG. 3.

Bonded to the lower surface of disc 19 is a resilient clamping plug 21 made of rubber, or the like, and a metal plate 22 is bonded to the lower surface of plug 21. The diameter of the unexpanded plug 21, as shown in FIG. 3, is slightly less than the diameter of flue 4, so that the plug can be readily inserted in the upper projecting end of the flue.

To expand plug 21 radially outward to securely engage the inner surface of flue 4, a toggle mechanism is utilized. The toggle mechanism, as best shown in FIGS.

3 and 4, includes a rod 23 which is mounted within central aligned holes in disc 19 and plug 21, and a bolt 24 is threaded into the lower end of rod 23 and extends downwardly through an opening in plate 22. Washer 25 is positioned against the head 26 of bolt 24, as shown in FIG. 3.

The upper end of rod 23 is mounted for sliding movement in a bushing 27 that is threaded within an opening in central section 13, and the upper end of rod 23 is connected by pin 28 to the end of a pair of generally L-shaped arms 29 which act as a crank. The central portions of arms 29 are attached by pivot 30 to a pair of side brackets 31 which are connected by screws 32 to opposed sides of bushing 27. Handle 33 connects the corresponding ends of arms 29.

When the handle 33 of the toggle mechanism is in the full-line position of FIG. 3, the head 26 of bolt 24 will be located a substantial distance beneath plate 22. As the handle is pivoted to the dashed position shown in FIG. 3, rod 23 will be moved upwardly, bringing washer 25 into contact with the lower surface of plate 22 to thereby compress plug 21. Axial compression of the plug will deform the plug radially outward into firm engagement with the inner wall of flue 4, to thereby clamp the plate 10 in position relative to the tank 1. With the plate 10 firmly clamped against cover 6, there will be no deformation of the cover due to the pressure of the expanding foam resin in space 8 during the foaming operation.

While the above description has shown the clamping mechanism engaged with the inner surface of the flue or tubular member, it is also contemplated that the clamping mechanism can clamp against the outer surface of the projecting end of the tubular member.

The clamping mechanism of the invention prevents deformation of the jacket cover during the foaming operation and also eliminates the need for screws or other fasteners to secure the cover to the upper edge of the jacket, for the cured foam will bond to both the cover and the jacket.

The clamping mechanism can be used with various sized tanks by merely changing the diameter of the resilient plug to correspond to the diameter of the flue.

While the above description has shown the clamping mechanism to be used with a gas-fired water heater having a central flue, it is contemplated that the clamping mechanism can also be utilized with an electric heater which has a central relief valve opening in the upper head bordered by a spud, and the clamping mechanism can be utilized to clamp against the spud. Alternately, the clamping mechanism can engage any structure associated with the upper head of the tank.

It is also apparent that a clamping mechanism, other than a toggle operated clamping mechanism, can be employed. Various modes of carrying out the invention are contemplated as being within the scope of the following claims particularly pointing out and distinctly claiming the subject matter which is regarded as the invention.

We claim:

1. An apparatus for clamping a cover to a jacket that surrounds a tank as the space between the jacket and the tank is filled with an expandable resin material during a foaming operation, the upper end of said tank having aperture means, said apparatus comprising retaining means disposed against the outer surface of said cover, and clamping means engageable with said aperture means to hold said retaining means against said cover and prevent deformation of the cover during the foaming operation.

2. The apparatus of claim 1, wherein said clamping means comprises an expandable member disposed within said aperture means, and means for expanding said expandable member radially into engagement with the inner surface of said aperture means.

3. The apparatus of claim 2, wherein said means for expanding comprises means for compressing said expandable member axially to thereby expand said expandable member radially into engagement with said aperture means.

4. The apparatus of claim 3, wherein said means for compressing comprises a pressure member disposed against a surface of said expandable member and mounted for axial movement relative to said aperture means, and operating means for moving said pressure member axially.

5. The apparatus of claim 4, wherein said operating mean comprises a manually operated toggle mechanism.

6. The apparatus of claim 1, wherein said retaining means comprises a generally flat plate having a central section and a plurality of legs extending outwardly from said central section.

7. The apparatus of claim 6, and including a slot in each of said legs with one of said slots disposed to be aligned with a worm hole in said cover when said plate is assembled with said cover.

8. In combination, a tank to contain a fluid to be heated, a jacket spaced outwardly of said tank with the space between said jacket and said tank to receive an expandable resin material, a cover enclosing the upper end of said jacket, a tubular member communicating with the interior of said tank and projecting outwardly beyond said cover, a retaining member disposed against the outer surface of said cover, and clamping means connected to said retaining member and releasably engageable with said tubular member to hold said retaining member against said cover and prevent deformation of said cover during the foaming operation.

9. The combination of claim 8, wherein said tank is a gas fired water heater tank and said tubular member is a flue extending axially through said tank.

10. The combination of claim 8, wherein said retaining member comprises a plate having a central section and a plurality of legs extending outwardly from said central section, said cover having a fill hole disposed between a pair of adjacent legs for introducing liquid resin into said space.

11. The combination of claim 10, wherein said cover is provided with a worm hole for discharge of foam resin, said worm hole being spaced from said fill hole, each of said legs having an aperture lying on a circle concentric with the axis of said plate one of said apertures being aligned with said worm hole when said plate is oriented with respect to said cover in a manner such that said fill hole is located between a pair of adjacent legs.

12. The combination of claim 8, wherein said clamping means is constructed and arranged to engage the inner surface of said tubular member.

13. The combination of claim 8, wherein said clamping means comprises a generally cylindrical plug of resilient material, said plug being disposed within said tubular member, and operating means for expanding said plug outwardly into engagement with the inner surface of said tubular member to secure said retaining member to said tubular member.

14. The combination of claim 13, wherein said operating means includes a pressure member disposed against a face of said plug, and means for moving said pressure member axially to thereby expand said plug radially into engagement with the inner surface of said tubular member.

15. The combination of claim 1, wherein said aperture means is a flue.

* * * * *

UNITED STATES PATENT AND TRADEMARK OFFICE
CERTIFICATE OF CORRECTION

PATENT NO. : 4,784,087
DATED : November 15, 1988
INVENTOR(S) : James L. Chevalier, et al It is certified that error appears in the above-identified patent and that said Letters Patent is hereby corrected as shown below:

IN THE CLAIMS: Col. 4, line 20, delete "mean" and substitute therefor ---means---; Col. 4, line 33, after "material" and before the comma insert ---during a foaming operation---; Col. 4, line 40, after "prevent" delete "," (comma).

Signed and Sealed this

Ninth Day of January, 1990

Attest:

JEFFREY M. SAMUELS

Attesting Officer     Acting Commissioner of Patents and Trademarks